US012252993B1

(12) United States Patent
Turner et al.

(10) Patent No.: US 12,252,993 B1
(45) Date of Patent: Mar. 18, 2025

(54) FLUID ACTUATOR OPERABILITY IMPROVEMENT WITH FAST ENERGY STORAGE

(71) Applicant: United States of America as represented by the Administrator of NASA, Washington, DC (US)

(72) Inventors: Mark Graham Turner, Cleveland, OH (US); Dennis E. Culley, Cleveland, OH (US); Jonathan L. Kratz, Cleveland, OH (US)

( * ) Notice: Subject to any disclaimer, the term of this patent is extended or adjusted under 35 U.S.C. 154(b) by 0 days.

(21) Appl. No.: 18/053,230

(22) Filed: Nov. 7, 2022

Related U.S. Application Data

(60) Provisional application No. 63/276,162, filed on Nov. 5, 2021.

(51) Int. Cl.
*F01D 15/10* (2006.01)

(52) U.S. Cl.
CPC .......... *F01D 15/10* (2013.01); *F05D 2210/12* (2013.01); *F05D 2210/32* (2013.01); *F05D 2220/323* (2013.01); *F05D 2220/76* (2013.01); *F05D 2270/20* (2013.01); *F05D 2270/331* (2013.01); *F05D 2270/44* (2013.01); *F05D 2270/54* (2013.01)

(58) Field of Classification Search
CPC .. F01D 15/10; F05D 2210/12; F05D 2210/32; F05D 2220/323; F05D 2220/76; F05D 2270/20; F05D 2270/331; F05D 2270/44; F05D 2270/54
USPC .............................................................. 415/1
See application file for complete search history.

(56) References Cited

U.S. PATENT DOCUMENTS

| | | | | |
|---|---|---|---|---|
| 2016/0281630 | A1* | 9/2016 | Rockwell | F02D 41/30 |
| 2016/0356237 | A1* | 12/2016 | Pursifull | F02D 41/20 |
| 2020/0347787 | A1* | 11/2020 | Crowley | F02C 9/00 |
| 2020/0392859 | A1* | 12/2020 | Turner | F02K 5/00 |
| 2020/0392860 | A1* | 12/2020 | Turner | F02C 7/36 |
| 2020/0392909 | A1* | 12/2020 | Turner | F02C 9/56 |
| 2021/0017878 | A1* | 1/2021 | Golfin | F01D 15/10 |
| 2021/0246837 | A1* | 8/2021 | Romero | F04D 27/0269 |
| 2022/0065175 | A1* | 3/2022 | McQuiston | F02K 5/00 |

OTHER PUBLICATIONS

Brennen, Cavitation and Bubble Dynamics, 1995, Oxford University Press (Year: 1995).*

* cited by examiner

*Primary Examiner* — J. Todd Newton
(74) *Attorney, Agent, or Firm* — Robert H. Earp, III; Mark Wolfgang; Trenton Roche

(57) ABSTRACT

A system for actuating fluid flow is disclosed. The system includes a fluid actuator, an electric motor for driving the fluid actuator, a motor controller for controlling the motor, a local energy storage device for powering the motor, a stability monitor that assesses instability of operation of the fluid actuator, and a mitigation control that mitigates instability of the fluid actuator via the motor controller based on the assessment of the stability monitor, wherein a response time of the mitigation is faster than changes in fluid flow in the system during fluid actuation.

18 Claims, 9 Drawing Sheets

Prior Art

100a

Prior Art

Prior Art

100c

FLUID ACTUATOR OPERABILITY IMPROVEMENT WITH FAST ENERGY STORAGE

RELATED APPLICATION

This application claims priority to U.S. Provisional Patent Application No. 63/276,162, "COMPRESSOR AND PROPULSOR EFFICIENCY IMPROVEMENTS FROM IMPROVED OPERABILITY ENABLED BY SUPERCAPACITORS INTEGRATED WITH ELECTRIC DRIVES," to Mark Turner et al., filed on Nov. 5, 2021, the entirety of which is hereby incorporated by reference.

This work was performed by the government for governmental purposes without the payment of any royalties thereon or therefore. The invention described herein was made in the performance of work under a NASA project.

FIELD OF DISCLOSURE

This disclosure relates to methods, devices, and systems that can assist propulsion, ventilation, and other systems that actuate fluid flow. In particular, the disclosure relates to electrical systems that can assist propulsion systems by increasing their efficiency and stability of operation.

BACKGROUND

Engines employ various fluid actuators (e.g., compressors, fans, pumps, turbines) to move and manipulate gas flow for propulsors, or the portion of the engine that propels forward motion. Ventilation and climate control systems may include similar actuators for actuating fluid flow. Instability in the functioning of these components, often caused by changes in pressure of the fluid flowing through them, can create inefficiencies. In particular, abrupt changes in fluid pressure in these systems may cause "cavitation," or the formation of and collapsing of cavities or bubbles in areas of low pressure. Cavitation can cause a mismatch between the power provided to fluid actuators and the pressure of the gas on which they act. More generally, inability of a fluid actuator to keep pace with instabilities in fluid flow can lead to stall, surge, and other adverse events for the systems. Especially where the systems propel aircraft, these adverse events can prove catastrophic.

FIG. 1A shows a schematic of a dual spool gas turbine engine design 100*a* with electric engine control capable on both shafts that may be subject to the above-mentioned instability considerations. Although FIG. 1A illustrates these concepts for a dual spool gas turbine propulsor system, it is to be understood that this is merely for illustrative purposes. The same or similar considerations can apply to other systems that actuate fluid flow (e.g., electric fans, compressors, pumps). As discussed in more detail below, these systems may employ active mitigation to prevent undesirable conditions resulting from instabilities.

System 100*a* can be used in vehicles where a gas turbine is interfaced with an electrical power system. Such systems may extract power from the gas turbine engine to generate electric power to feed, for example, electric propulsors. The power system may also be used to augment the engine's thrust production. FIG. 1A shows system 100*a* consisting of two spools, each consisting of a compressor and a turbine mechanically connected to an electric machine. The low-pressure spool consists of low-pressure compressor (LPC) 102*a*, low pressure turbine (LPT) 102*b*, and electric machine 103*a*. The high-pressure spool consists of high-pressure compressor (HPC) 101*a*, high pressure turbine (HPT) 101*b*, and electric machine 103*b*. The electric machines 103*a* and 103*b* are each mechanically powered from their respective shaft. The electrical power system may be used to stabilize functioning of fluid actuators in system 100*a*.

System 100*a* functions as a gas turbine where at least a portion of the propulsive power is converted to electrical power. System 100*a* includes two shafts enabling each to rotate at different speeds. System 100*a* includes high pressure components HPC 101*a* and HPT 101*b*. The HPC 101*a* provides high pressure fluid (e.g., air) to the HPT 101*b* so that the latter can function at a different speed than LPT 102*b*. System 100*a* also includes a low-pressure compressor (LPC) 102*a* and a LPT 102*b*.

The LPC 102*a* feeds fluid to the HPC 101*a*. The system 100*a* creates propulsive fluid power by combining high pressure flow with combustor output at COMB 104. Both turbines HPT 101*b* and LPT 102*b* convert fluid power to mechanical shaft power. The electric machines 103*a* and 103*b* are considered to be generators and each may convert mechanical shaft power to electric power for the purpose of supplying a power grid connected to electrical loads. Both electric machines 103*a* and 103*b* are controlled by electronics 105. Electronics 105 may include control systems, power electronics, and power transmission hardware, as well as various computer systems.

In a typical configuration, electric machines 103*a* and 103*b* may provide power to one electric machine EM_P 106. EM_P 106 may interface with the system 100*a* through a power grid that includes machines 103*a* and 103*b*. Under this configuration, however, EM_P 106 is coupled to the HPT 101*b* and LPT 102*b*, and subject to varying loads. Because EM_P 106 may be subject to varying power supply and demand, the fluid actuators (101*a*, 101*b*, 102*a*, and 102*b*) and any propulsor connected to EM_P 106 may be subjected to vagaries and transients related to a stiff power supply that is challenging to manage with precision. If instabilities manifest and propagate, this can cause damaging and/or catastrophic circumstances for the operation of the actuators. Instabilities in power supply can potentially cause a loss of vehicle thrust, for example.

Other instabilities can lead to similar problems in operation of system 100*a*. For example, variations in fluid flow and pressure in compressors, fans, or pumps can lead to undesirable erratic operation. Stall or surge of these components can lead to sudden and, potentially, catastrophic loss of thrust due to undesired blocked/choked flow, loss of pressure rise, and inability to sustain combustion. Mismatches in compressor rotational speed and fluid flow can results in higher than desired loading, typically associated with a low fluid flow rate for a given pressure ratio across the component. In the gas path, this can manifest as significant off-incidence flow impinging on the compressor blades. If severe enough, stall or surge can occur. Moreover, mechanical components in system 100*a*, and other systems designed for acculturating fluid (e.g., those for ventilation or climate control) generally have precision designs with relatively small tolerances. Since systems 100*a* tend to operate at high temperatures, and experience large swings in temperature, thermal expansion or contraction of components can impact flow paths subject to those relatively small tolerances. Restriction or expansion of flow can cause pressure changes similar to those described above, with similar consequences on compressor functioning. Where different materials are used for different components, differences in thermal expansion of the different materials can exacerbate the issue.

Because of this potential for operational variation, and the need to maintain operational stability, designs of propulsors and other fluid actuating systems tend to include a "stability margin." This is a designed-in ability to accommodate a window of operating conditions at near optimal or high performance. The stability margin can account and compensate for maintaining performance while the system experiences a change in operating point and distortion (e.g., a deviation of the fluid flow from ideal uniform expectations). Including a stability margin in a design can improve safe operation and can prevent shut down. However, building in too much operational tolerance and safety sacrifices engine performance. Therefore, a way to reduce the required stability margin without adversely impacting safety improves efficiency and performance is desired.

FIG. 1B represents this stability margin concept schematically in the context of a hypothetical system that can actively adjust or control fluid actuator operation to prevent stall. FIG. 1B is reproduced in large part from Strazisar, Anthony J., Michelle M. Bright, Scott Thorp, Dennis E. Culley, and Kenneth L. Suder. "Compressor stall control through endwall recirculation." In Turbo Expo: Power for Land, Sea, and Air, vol. 41707, pp. 655-667. 2004. More specifically, the plot 100*b* in FIG. 1B shows a region stabilized with active flow control 110 on a plot 100*b* of pressure rise vs. mass flow through a propulsor system. Pressure rise is the pressure on the fluid actuator itself, output pressure minus input pressure. Mass flow measures the flow of fluid through the actuator. A stall line with control 120 forms the left boundary of the region stabilized with active control 110, indicating a region where the propulsor systems would stall without active engine flow control. Stalling indicates loss of thrust provided by a propulsor and high stresses on the fluid actuator. Forming the right boundary of region 110 is a stall line without control 130. This indicates the region where the propulsor system may stall even with engine control. The constant speed line 140 represented in FIG. 1B, represents how the mass flow varies with pressure rise at a constant fluid actuator speed. This is typically accomplished by changing the exit pressure through a valve far downstream. In operation, distortion and transient events can have the fluid actuator run inadvertently near a stall boundary so one operated to the right of that boundary. When a stabilizing system operates, it can move the operating point of the propulsor system from the operating point without control 150, located within one of the stall regions, to the actively stabilized operating point 160 within the region stabilized with active control 110. As shown in FIG. 1B, this action represents a performance improvement 170 for the propulsor system. In addition, there is typically an efficiency improvement.

Known fluid actuator systems typically trade-off response time to maintain stability margin in this way to maintain high stability 110. Other than the aforementioned designed-in stability margin and traditional control through the limiting of control inputs the determine system responsiveness, there is currently no other method to reduce the resulting transient from the above-mentioned operating point instabilities. Yet these approaches have multiple disadvantages. For one, large stability margins must be included in the system design. The size of the stability margin correlates to the ability to correct or adjust operation of the actuator according to changes in conditions. Specifically, if the ability to adjust operation of the actuator is limited, the stability margin will have to be relatively large. Second, variable geometry such as Variable Bleed Valves (VBV)s and Variable Stator Vanes (VSV)s are typically utilized to keep the components at points which are stable. This can add weight and cost. It can also reduce efficiency. Third, known systems to actively control fluid actuator stability are limited by the speed at which they operate and provide mitigation. Often conditions in the system can change faster than the control system can respond. This can result in stall or other problems despite efforts to actively control these systems with the traditional suite of actuators.

SUMMARY

Given the above, there is an unmet need to provide a stabilization for fluid actuator systems. There is a further unmet need to provide stabilization or corrective measures on a time scale sufficient to increase the operating efficiency of the fluid actuator systems.

In particular, corrective systems need to respond on time scales that are at least as fast as changes in fluid flow in the actuator system that might cause destabilization. Doing so will, amongst other things, decrease stability margins that need to be designed into these systems. The time scale of these changes can be on order of 10 μs for fluid flow, greater for changes due to mechanical reasons (e.g., changes in engine shaft speed and thermal expansion of component of the system). There is an unmet need for active control systems that can respond to and mitigate changes in fluid flow on this time scale.

One of the limiting features in the response time of any electrical motor is the timescale for delivery of power and/or the uptake of excess power by a local power source powering the motor. Conventional battery systems, e.g., lithium-ion battery systems, have power charging response times that can absorb power on time scales on the order of 100 ms. Therefore, control systems that can respond faster, on order of changes in mechanical operation of turbines or changes in fluid flow conditions, would be advantageous. In addition, improved capacity to store and deliver energy generally results in an increase in weight, which can be detrimental to propulsion systems utilized in aircraft. Systems that can deliver increased power without a corresponding weight increase are desirable.

Supercapacitors allow for very fast discharge (about 600 times that of a lithium-ion battery) and storage of energy that can change the torque and speed (rpm) of an electric motor. In addition, supercapacitors are relatively light weight. If an electric motor is attached directly or through a drive train to a fluid actuator (fan, compressor, pump, etc.), stall can be avoided when precursors to stall are detected with instrumentation. The propulsor could be in a tail cone thruster, distributed propulsion or as part of an Urban Mobility Vehicle, for example. A feedback control system combined with a power control device is used to prevent an undesirable fluid flow condition. For these and other reasons, the present disclosure introduces systems providing active control, based in part, on power provided by fast response energy storage systems including supercapacitors.

Other systems that can provide and store power quickly include flywheels. Flywheels have high power density and have also been called Kinetic Energy Recovery Systems (KERS) and have been used in automotive and space application. In propulsion system with multiple rotating components, power management control can be utilized to shift power between components as needed, essentially treating the other component(s) in the system like flywheels. Batteries could be applicable if they are relatively large. That could be the case in hybrid electric aircraft applications where large amounts of energy storage are present to augment thrust.

More specifically, disclosed herein is a system for actuating fluid flow. The system includes a fluid actuator, an electric motor for driving the fluid actuator, a motor controller for controlling the motor, a local energy storage device for powering the motor, a stability monitor that assesses instability of operation of the fluid actuator, and a mitigation control that mitigates instability of the fluid actuator via the motor controller based on the assessment of the stability monitor, wherein a response time of the mitigation is faster than changes in fluid flow in the system during fluid actuation.

The disclosure also includes a method for actuating fluid flow. The method includes actuating the fluid via a fluid actuator, driving the fluid actuator via an electric motor, controlling the electric motor via a motor controller, powering the electric motor via a local energy storage device, assessing stability of operation of the fluid actuator, and mitigating stability of the fluid actuator based on the assessment, wherein a response time of the mitigation is faster than changes in fluid flow in the system during fluid actuation.

DETAILED DESCRIPTION

Overview

As discussed above, the following describes a control system for, among other things, overcoming uncertainty in design and operation of the fluid actuator systems. For the best results, a fast response actuator system (e.g., quick change of rpm to prevent a disruption in pressure and mechanical unsteadiness) is advantageous. As also discussed above, faster response time can be provided by a stabilization system that includes an improved method of power delivery (e.g., including a supercapacitor or other fast acting energy storage device) over conventional systems. Such faster response could better address uncertainties created by variances in operation and operating condition of the fluid actuator system. The sum of such variances will be referred to herein as the "transient stack." Stability control and mitigation can allow relatively small stability margin even when uncertainties from multiple sources add up to a large transient stack. For a typical fluid actuator system (e.g., having a fan, compressor, and propulsor) less stall margin needed could mean a higher loaded compressor with fewer stages, higher efficiency, or extra thrust/actuation capability.

Figure 1A:
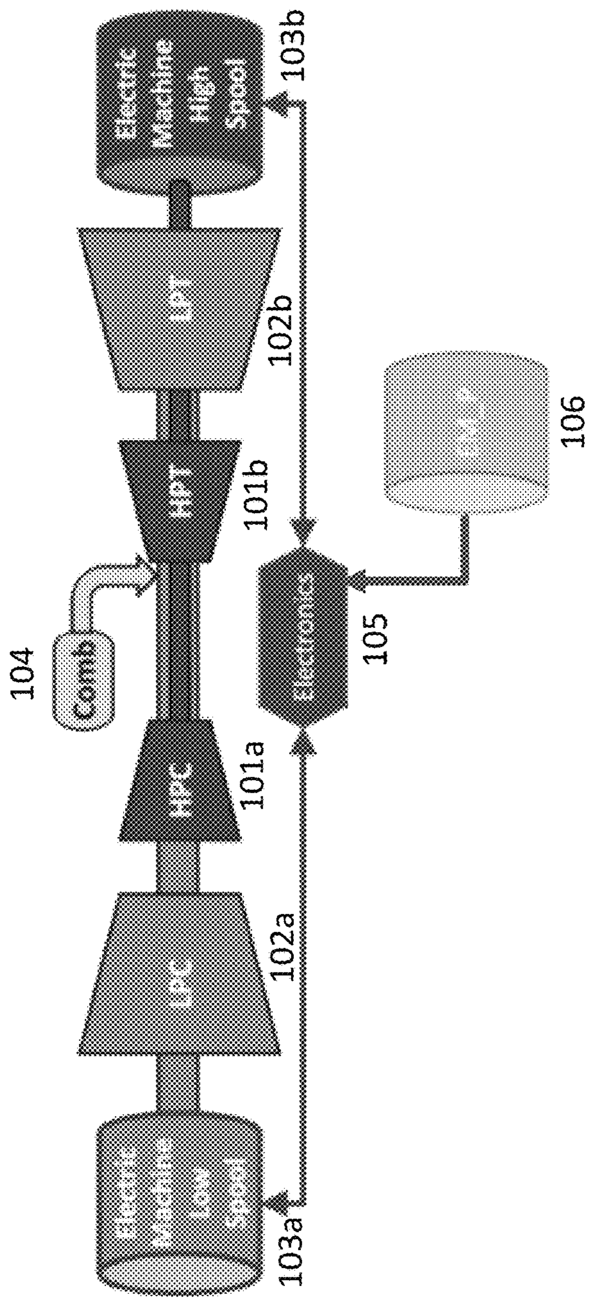
FIG. 1A shows a schematic of an exemplary engine design with dual electric engine control of compressors and turbines that may be subject to instabilities in fluid flow.
Figure 1B:
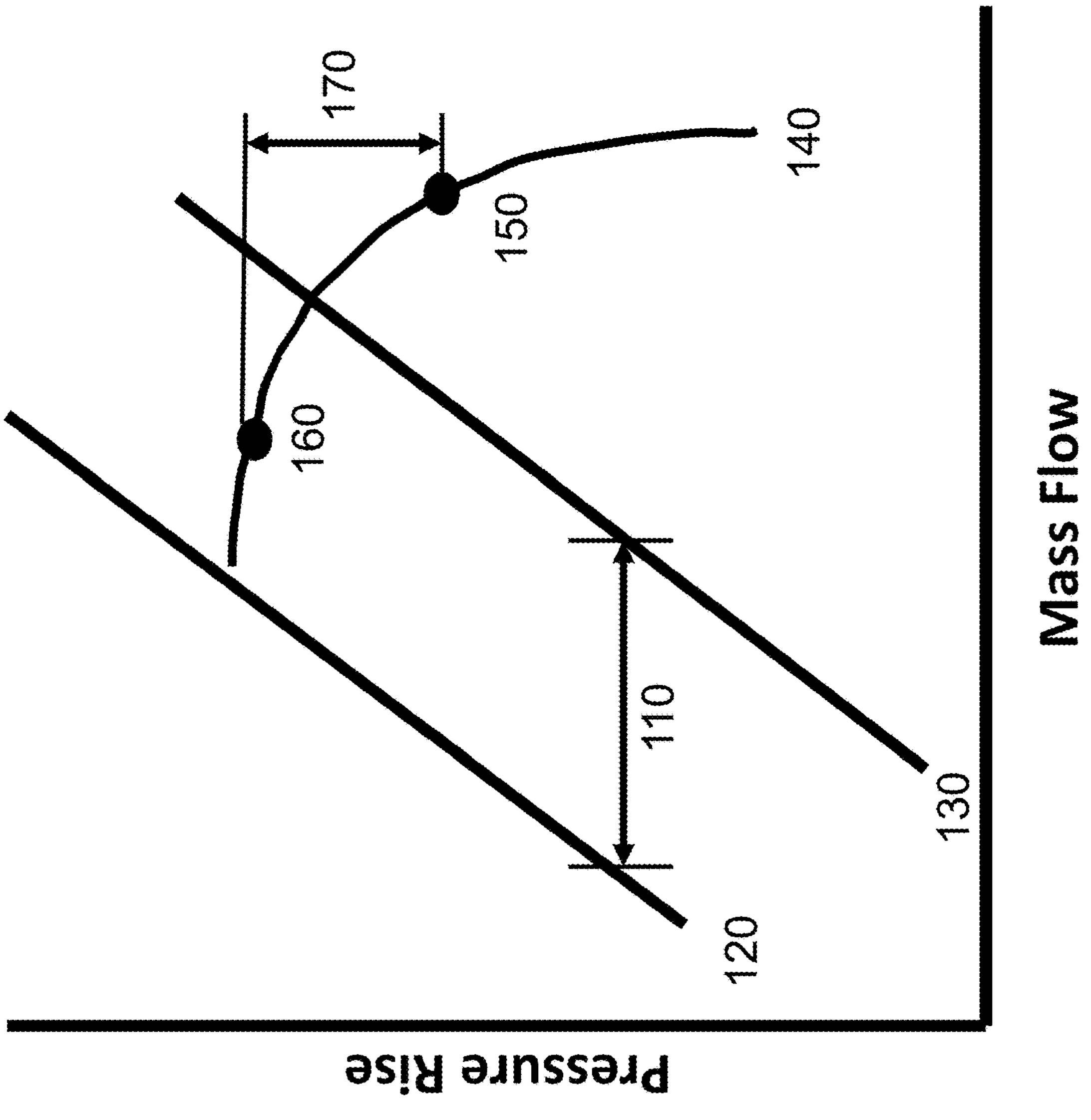
FIG. 1B is a schematic representation of a stability margin in the design of fluid actuating systems like system 100*a;*
Figure 1C:
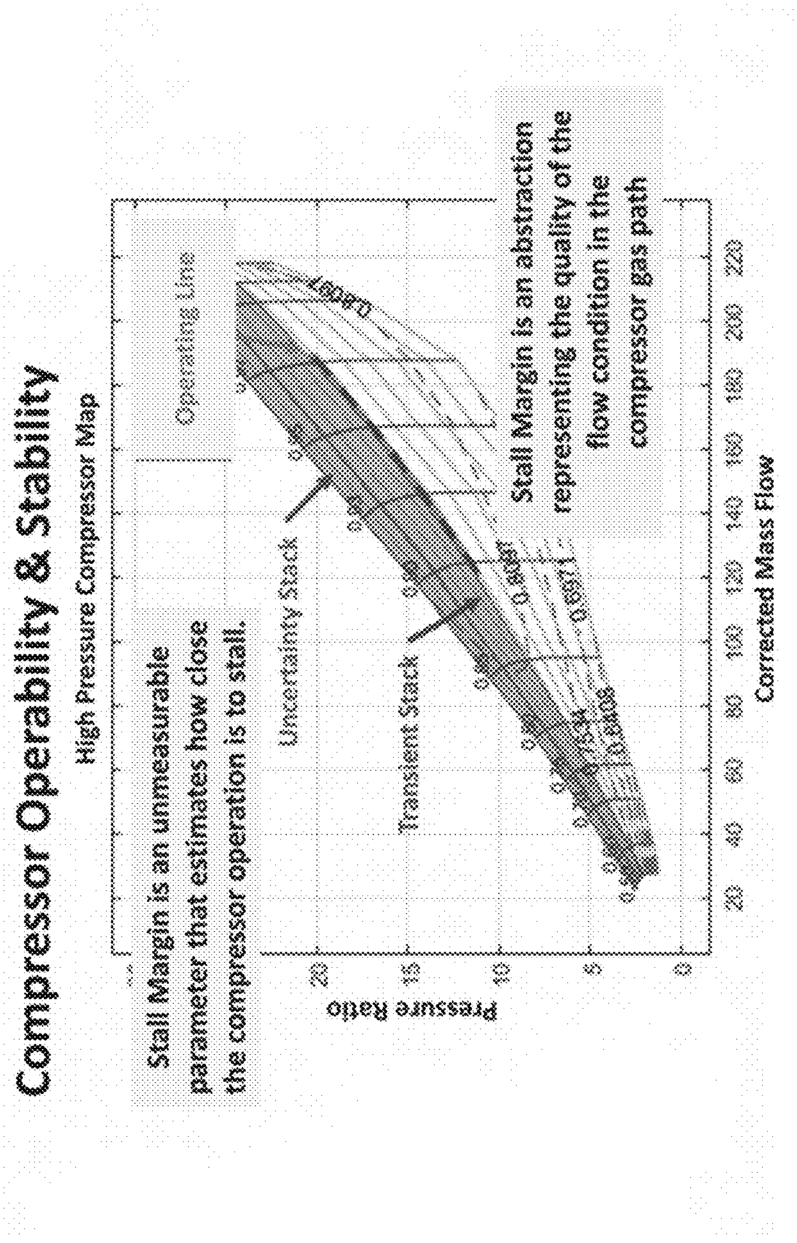
FIG. 1C is a schematic showing potential effect of a mitigation system to correct for operational uncertainty and instability in a fluid actuator system.

FIG. 1C is a schematic showing potential effect of a mitigation system to correct for operational uncertainty and instability in a fluid actuator system. The plot 100*c* is roughly comparable to the plot 100*b* in FIG. 1B, except that it shows the cumulative effect of both uncertainties in operation ("uncertainty stack") and transients ("transient stack"). FIG. 1C shows an "operating line," which represents a region in which the actuator system can operates as intended without substantial stall or surge. Implicit in the operating line is a concept called "stall margin," which is defined as a parameter that estimates how close the compressor of the system is to stall. The stall margin accounts for transient flow through the system. Here, stall margin represents the quality of flow condition in the gas flow path within the actuator system. FIG. 1C shows how mismatches in pressure relative to flow through gas path in the system, so-called off-nominal conditions, threaten overall actuator stability. The "transient stack" is needed because the acceleration and deceleration of a shaft changes the point of operation. Also on this plot are contours of constant efficiency. Efficiency of a fluid actuator could be increased if a higher stall margin is available through active control. In principle, one can design a mitigation system that can provide feedback and selective power to the actuator system to ensure operation close to the operating line. The system should be responsive to precursors that may be indicative of imminent stall or surge.

Such precursors (e.g., excessive turbulence in fluid flow, spike in power draw, etc.) can be directly monitored by a control system. Precursor sensing devices, for example, may include high response pressure transducers or power electronics attached to the actuator. Detected rapid power changes and/or actuator speed changes could mean stall is imminent. In addition, issues caused by thermal expansion of certain components, particularly those having small radii with high clearance can be detected by sensors either embedded in the casing and/or actuator. Expansion due to rpm changes in actuator/rotor operation can be rapid, sometimes nearly instantaneous. More generally, the time between the precursor and change in actuator functioning (e.g., stall) can be very short, e.g., on order of ms or less. Therefore, it is advantageous to sense these precursors in real time using sensors deployed in the actuator system. Disclosed systems herein may detect certain stall precursors up to 2000 actuator/rotor revolutions ahead of stall. This may allow sufficient time for mitigation depending on the particulars of the mitigation/control system.

To mitigate imminent stall that may follow a sensor indicating a rapid decrease in gas flow pressure (or other pressure fluctuations, speed or motor torque/current unsteadiness, for example) through the system and to the actuator, the control system can rapidly increase rotations per minute of the actuator. This rapid increase in rpm can avoid stabilize the compression system, for example. Generally, an increase in actuator speed/rpm may prevent the actuator system from exceeding stress limits of the system at lower pressure. In multi-spool engines (e.g., 100*a*), deceleration of one of the motor shafts driving the actuators that is not near stall can also be effectuated rapidly. Torque can be applied selectively between the connecting shafts by an additional electric control beyond the primary drive. In principle, all these can be mitigated to prevent stall by a control system. However, mitigation effectiveness depends on the speed at which power can be supplied to the system (e.g., to increase rpm, in the example). This problem can be particularly difficult since the momentum/inertia of the actuator can cause its speed of rotation to lag behind abrupt changes in the flow of gas. This momentum should be dealt with by the control system adding or subtracting power to the system.

As discussed above, power supplied in control system via traditional batteries or other energy storage systems have power supply limitations regarding the time scale over which they can apply power. Adding fast response energy storage (e.g., one or more supercapacitors and/or a flywheel) as part or all of the energy storage and power delivery system can enable more rapid changes in rpm and power. In particular, supercapacitors can also source/sink energy very rapidly, unlike typical batteries that have a limited ability to absorb energy. The fast response energy storage can provide more greater ability to quickly absorb and add power. As disclosed herein, fluid actuation systems connected to electric motors/generators can benefit from the use of fast response energy storage in engine control systems.

Exemplary Fluid Actuation System 200

Figure 2A:
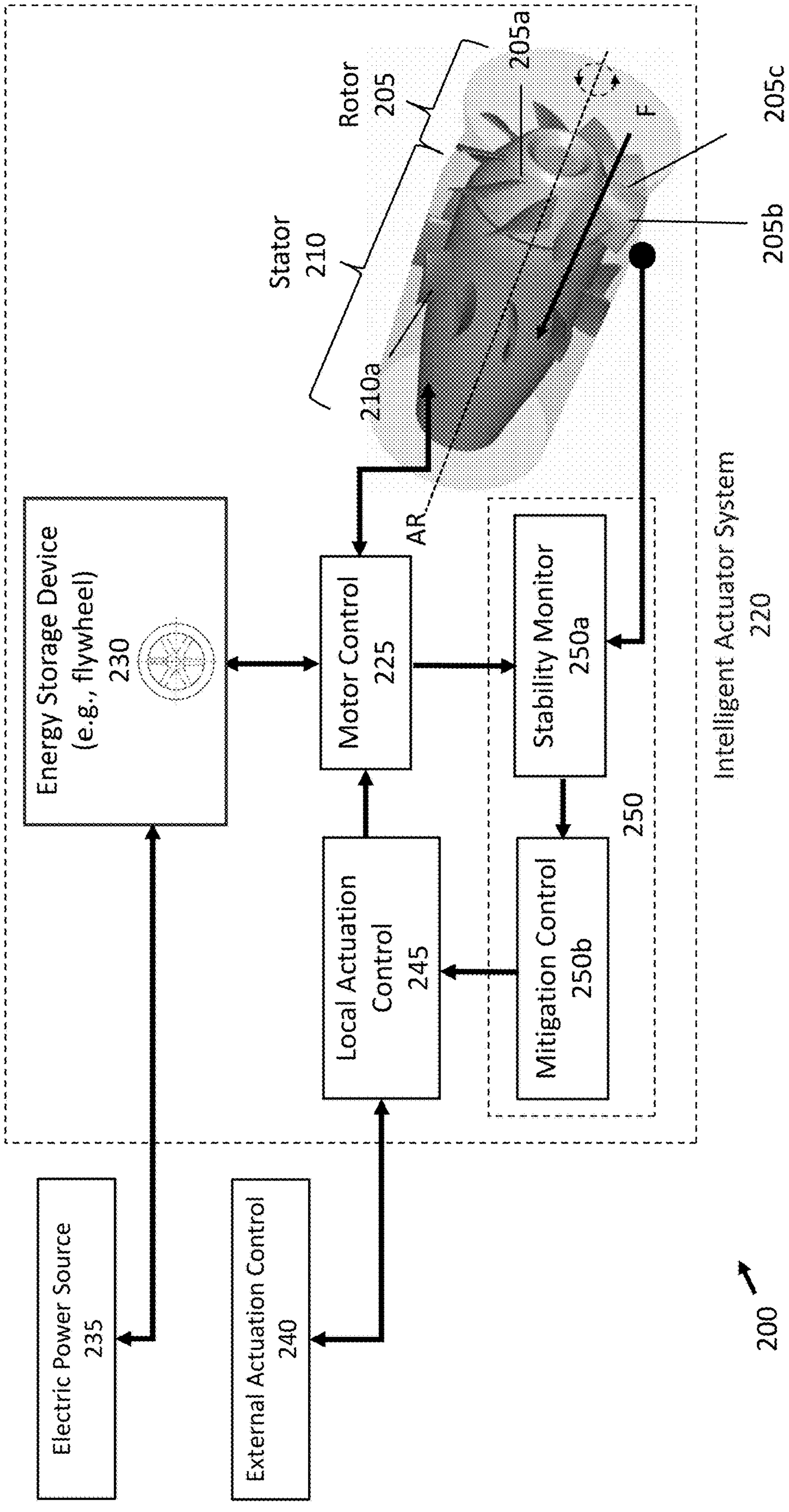
FIG. 2A shows an exemplary fluid actuation system 200 including instability mitigation that may be used in the context of the present disclosure.
Figure 2B:
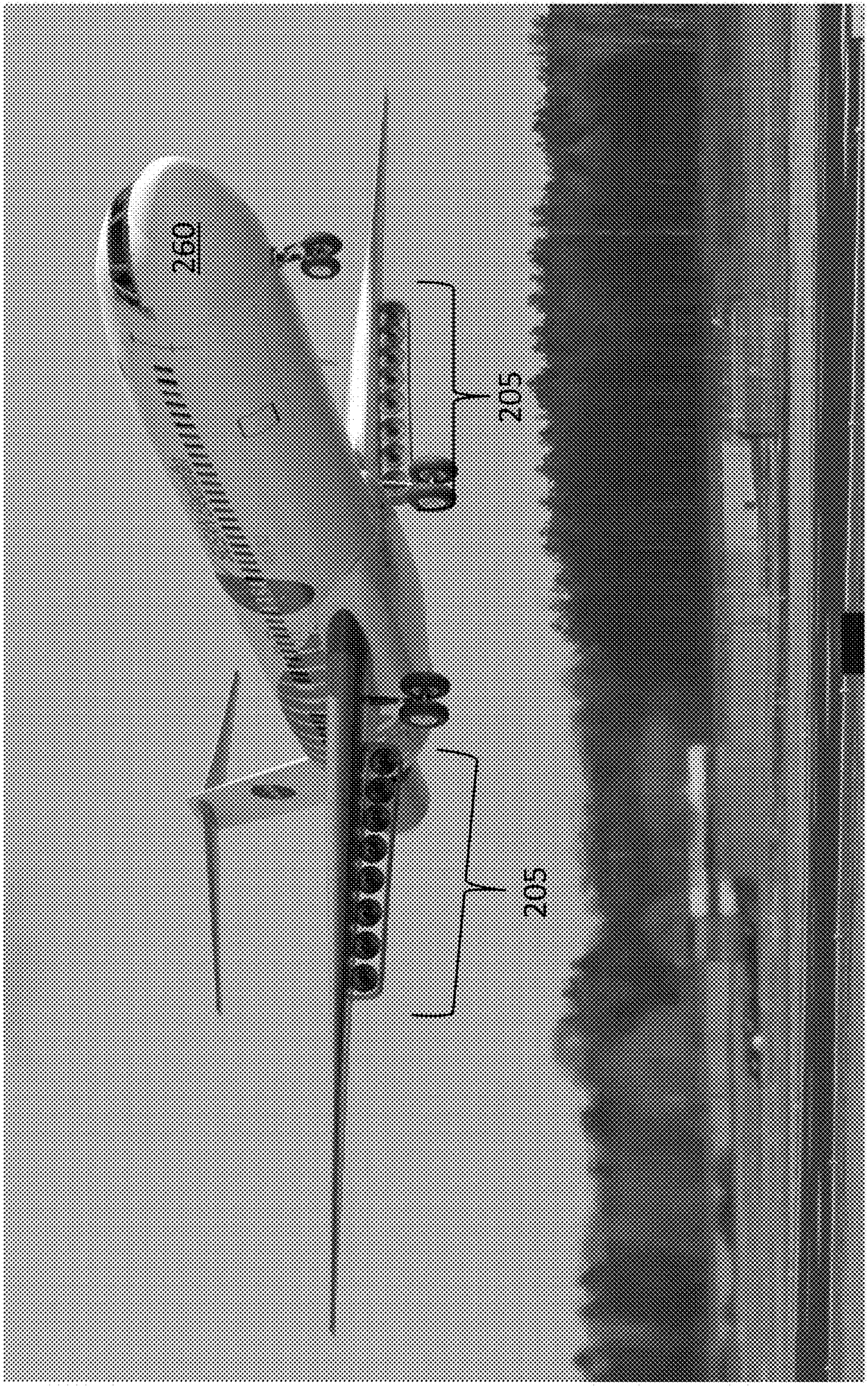
FIG. 2B shows an exemplary vehicle that may use a fluid actuator like system 200 according to aspects of the present disclosure.

FIG. 2A shows an exemplary fluid actuation system 200 that may be used in the context of the present disclosure. In system 200, a rotor 205 provides fluid flow for an application. Applications for the provided fluid flow can include, for example, providing propulsion either to an aircraft or a seacraft (e.g., a jet ski, ferry, or submarine). FIG. 2B shows an exemplary vehicle 260, NASA's Subsonic Single After Engine (SUSAN) transport aircraft with wing-mounted electrical propulsors. Vehicle 260 may use fluid actuation according to aspects of the present disclosure, in particular those shown in FIG. 2A. Other applications can use fluid flow for reasons other than propelling a vehicle. These include circulated gas or other fluid in, for example, a ventilation control system (e.g., a system for maintaining airflow through a vehicle or building). Still others include climate control systems, computer cooling fans, pumps in industrial applications, or other systems that have compressors, fans, or pumps driven by electric motors.

As shown in FIG. 2A, a fluid actuator system may include a rotor 205 and stator 210. The rotor 205 and other components of system 200 may be driven or controlled by the same intelligent actuator system 220. In the exemplary configuration, gas flow is in the direction F shown in the figure, i.e., so the flow encounters rotor 205 prior to stator 210. Blades 205*b* and 205*c* on the rotor 205 propel flow along axis AR and create rotational flow around axis AR. Blades on stator 210 (e.g., blade 210*a*) can channel the flow actuated by rotor 205 so as to minimize rotational flow around axis AR and convert energy from rotational into axial momentum along AR. Blades 210*a* may form an Outlet Guide Vane (OGV), for example, or an Exit Guide Vanes (EGV).

Although FIG. 2A shows a rotor 205/stator 210 configuration that may be used in the context of the present disclosure, it is to be understood that this configuration is merely exemplary. Any of the fluid actuation systems discussed herein may be used in place of rotor 205/stator 210 in conjunction with system 200. For example, actuating components in system 100*a* (e.g., HPC 101*a*, HPT 101*b*, LPC 102*a*, and LPT 102*b*) can be used in conjunction with system 200. In general, any suitable compressor, fan, pump, or other fluid actuator system may be used in conjunction with system 200. It is to be understood that system 200 illustrates mitigation, actuation, power, and control systems that can be applied generally to fluid actuation systems used in applications as diverse as propulsion, ventilation, and climate control, as well as other applications.

As shown in FIG. 2A, the intelligent actuator system 220 may include a dedicated motor control 225, analogous to electronics 105 in FIG. 1A. The motor control 225 may drive a motor or motors that drive the rotor 205. More specifically, the motor control 225 may provide power to rotor 205 and/or any other active components in the fluid actuation system 200. Motor control 225 may provide power independently to these components. Typically, it is advantageous to provide differing amounts of power to different components to allow them to act independently.

Motor control 225 may draw power from a local energy storage device 230. Motor control 225 may also draw power from electric power source 235. Electric power source 235 may be a system-wide power source that, for example, provides power to other portions of a vehicle (not shown) using the fluid actuation system 200 to provide thrust. In some ways, electric power source can operate in an analogous manner to EM_P 106 in FIG. 1A. In contrast, energy storage device 230 is generally a local power system dedicated to the intelligent actuator system 220. Energy storage device 230 may draw power from electric power source 235 periodically, continuously, or in other ways. Electrical storage device 230 may draw said power to power a number of suitable energy storage devices. Electrical storage device 230 may then provide power to the rotor 205 according to the motor control 225. Providing power locally via device 230, as opposed to via global source 235, protects rotor 205 (and any other fluid actuator that may be used in conjunction with system 200) from sudden changes in loading and power that can introduce catastrophic instability in these components, as described in the context of FIG. 1A.

Electrical storage device 230 may include a number of energy storage mechanisms, including supercapacitors and batteries. Inclusion of supercapacitors, in particular, in storage device 230 may allow power delivery to motor(s) driving rotor 205 on a very quick time scale, e.g., providing at least the amount of power to overcome system inertia and losses during momentary accelerations and decelerations where energy is sourced discharge rate requirements will be subject to the application. In general, any suitable type of energy storage device may be used in device 230 that can provide power to rotor 205 on a time scale appropriate to address changes in operating conditions described in the context of the stability monitor 240. This includes both power supply and acquiring and storing excess power that may be unused or produced by the rotor 205.

Suitable energy storage mechanisms in device 230 include various types of supercapacitors, devices with capacitance often six orders of magnitude larger than conventional capacitors but with limited voltage capability. Typically, the elements are connected in various series and parallel configurations to meet voltage and energy requirements, much like the elements used in hybrid automotive applications. Supercapacitors that may be used are sometimes called ultracapacitors. They include those use electrostatic double-layer capacitance, e.g., electrostatic double-layer capacitors (EDLCs), and electrochemical pseudocapacitance. Suitable capacitors may include those using carbon electrodes with charge separation on order of angstroms. Suitable capacitors include electrochemical capacitors with metal oxide and/or conductive polymer electrodes. In addition, hybrid capacitors (e.g., lithium-ion capacitors) may be used. Hybrid capacitors may include an electrode exhibiting mostly electrostatic capacitance and another exhibiting mostly electrochemical capacitance, for example.

Other suitable components that may be included in device 230 include any suitable type of battery, such lithium-ion batteries. Others include alkaline and nickel metal hydride (NIMH) batteries. Device 230 may further include a fuel cell. For example, one type of fuel cell that may be included in device 230 is a polymer electrolyte membrane (PEM) fuel cells, solid oxide fuel cells, direct methanol fuel cells, alkaline fuel cells, phosphoric acid fuel cells, carbonate fuel cells, and other suitable types of fuel cells. Still others include other methods of energy storage.

Still others include other methods of energy storage. One such example is a flywheel, where a mass in the form of a disk or wheel rotating about its axis at relatively high speed is used to store kinetic energy. Another example is superconducting magnetic energy storage where electrical current circulating in a lossless circuit at cryogenic temperatures is used to store electrical energy. Both methods require additional equipment and electronics to add or remove energy from the energy storage device.

One purpose of device 230 is to store power from source 235 such that rotor 205 and other active components can be isolated from source 235 since power source 235 may be subject to instabilities. For example, if the intelligent actuator system 220 is part of a vehicle, source 235 would provide power to other parts of the vehicle. These other parts could include any system drive or computing system mounted to operate the vehicle. Other components could include lighting systems, ventilation systems, environmental systems, communication systems, etc. If source 235 is mounted in an extra-terrestrial vehicle, for example, the other components powered via source 235 may include systems for environment or pressure maintenance, or any of the other systems discussed above. In any event, regardless of the additional systems powered by source 235, the load created by these systems will burden source 235. The burden may cause surges or decreased power. Such intermittences could perturb the rotor 205 if either one is fed directly from source 235. Therefore, local device 230 can improve performance and smoothness of operation of the intelligent actuator system 220.

In addition to external source 235, the system may also include an external actuation control 240 external to the system 220. External actuation control 240 can include, for example, a vehicle thrust control that can, via local actuation control 245 and motor control 275, control rotor 205 sufficiently to provide thrust to the vehicle. Alternatively, in the case that system 220 provides actuation for a purpose other than providing thrust to a vehicle, control 240 may actuate that function. For example, in the case that system 200 provides ventilation to an interior space, actuation control 240 may control rotor 205 to provide the ventilation. In either case, actuation control 240 would be subject to external input to control aspects of the system 200.

System 220 further includes local actuation control 245 that can interact with motor control 225, and the stability control 250. More specifically, local actuation control 245 translates thrust or actuation requests from the external actuation control 240 and mitigates them according to the input from the stability control 250. Local actuation control 245 then commands the motor control 225 accordingly to create the desired thrust or actuation by selectively powering rotor 205.

Stability Control 250 includes the methods of detecting instabilities in system 220 and mitigating those instabilities by providing dynamic perturbations of the local actuation control 245.

As discussed above, the stability control 250 can interact with the local actuation control 245 primarily to provide the local activation control 245 with stability mitigation information. Therefore, one purpose of the stability control 250 is to ascertain information regarding the stability of operation of the rotor 205. More specifically, the stability monitor 250*a* of the stability control 250 assesses whether or not operation of the rotor 205 show instability in operation (e.g., pressure or current instability). Such instabilities may arise due to separation of fluid flow within the fluid actuation device. Changes in dynamic pressure measurements or aerodynamic loading as reflected in current measurement of the motor controller are examples of potential indications of instabilities.

Figure 3:
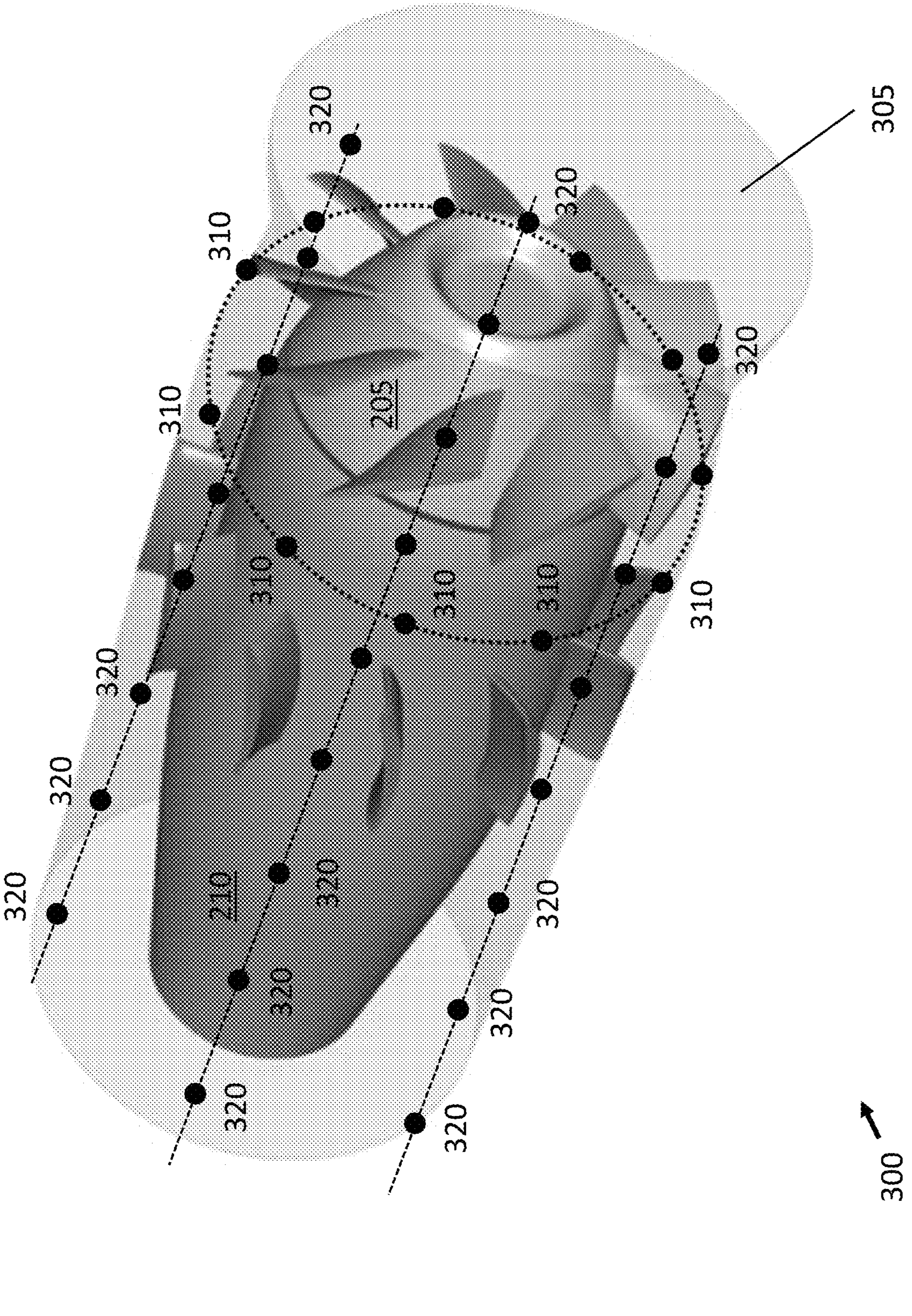
FIG. 3 shows an exemplary sensor setup 300 on a fluid actuator that may inform the stability monitor 250*a;*

FIG. 3 shows an exemplary sensor setup 300 that may inform the stability monitor 250*a*. In particular, FIG. 3 shows arrays of circumferential sensors 310 mounted along the circumference of rotor 205 and its casing 305. The circumferential sensors 310 can, for example, monitor local instability in pressure applied by the rotor 205. Coordinating instabilities measured by the circumferential sensors 310 with their location can provide spatially resolved instability information for the stability monitor 250*a*. Similarly, arrays of axial sensors 320 can measure pressure instabilities and or power distribution along the rotation axis AR of the rotor 205. It is to be understood that, while FIG. 3 shows only circumferential 310 and axial 320 sensors, any suitable type of sensor or configuration can be used to measure stability (or instability) of operation of the rotor 205 and fluid flow through casing 305 or other parts of system 200. Moreover, while FIG. 3 shows sensors 310 and 320 mounted to rotor 205, stator 210, and casing 305, it is to be understood that sensors 310 and 320 may be mounted on other components. In particular, sensors 310 and 320 may be mounted on any components of system 200 where fluid flow instabilities and/or other instabilities related to providing power may arise.

Stability monitor 250*a* obtains information from sensors related to the rotor 205 and/or stator 210 (e.g., sensors 310 and/or 320). Stability monitor 250*a* may then process the sensor information to, for example, detect and locate (spatially, or within wiring or within detector array) any issues or instability. Other types of processing are possible. For example, stability monitor 250*a* may determine suggested mitigation steps based on any detected instabilities. If no instabilities are detected, stability monitor 250*a* may then determine a stable condition. Subsequent to analyzing the stability sensor data, the stability monitor 250*a* then forwards the information regarding instabilities to the mitigation control system 250*b* portion of the stability control system 250.

The mitigation control 250*b* then receives the processed stability data from the stability monitor 250*a*. The mitigation control 250*b* determines mitigation actions based on the stability data. For example, if the stability data indicates that one of the circumferential sensors 310 indicates a sudden drop in pressure or senses pressure signatures indicative of approaching stall/surge, the mitigation control 250*b* may prescribe, as a mitigation action, to change the rotor 205 speed. Such changes may initiate a rapid change in the rpm of the rotor 205, for example, to offset pressure changes indicative of instabilities. The mitigation control 250*b* may follow a similar protocol with respect to any instabilities detected via one or more of the array of axial sensors 320. In each case, where the mitigation control 250*b* receives information concerning an instability, the mitigation control 250*b* can decide 1) if the instability is of sufficient magnitude to require correction and 2) what the appropriate correction should be.

As discussed above, the mitigation control 250*b* and the external actual control 240 provide actuation control and mitigation control, respectively, to the local actuation control 245. The local actuation control 245 then translates this information into commands for the motor control 225 to operate the rotor 205. As discussed above, mitigation actions may result in performance improvements in the overall system (e.g., performance improvement 170 shown in FIG. 1A).

Exemplary Implementation 400

Figure 4A:
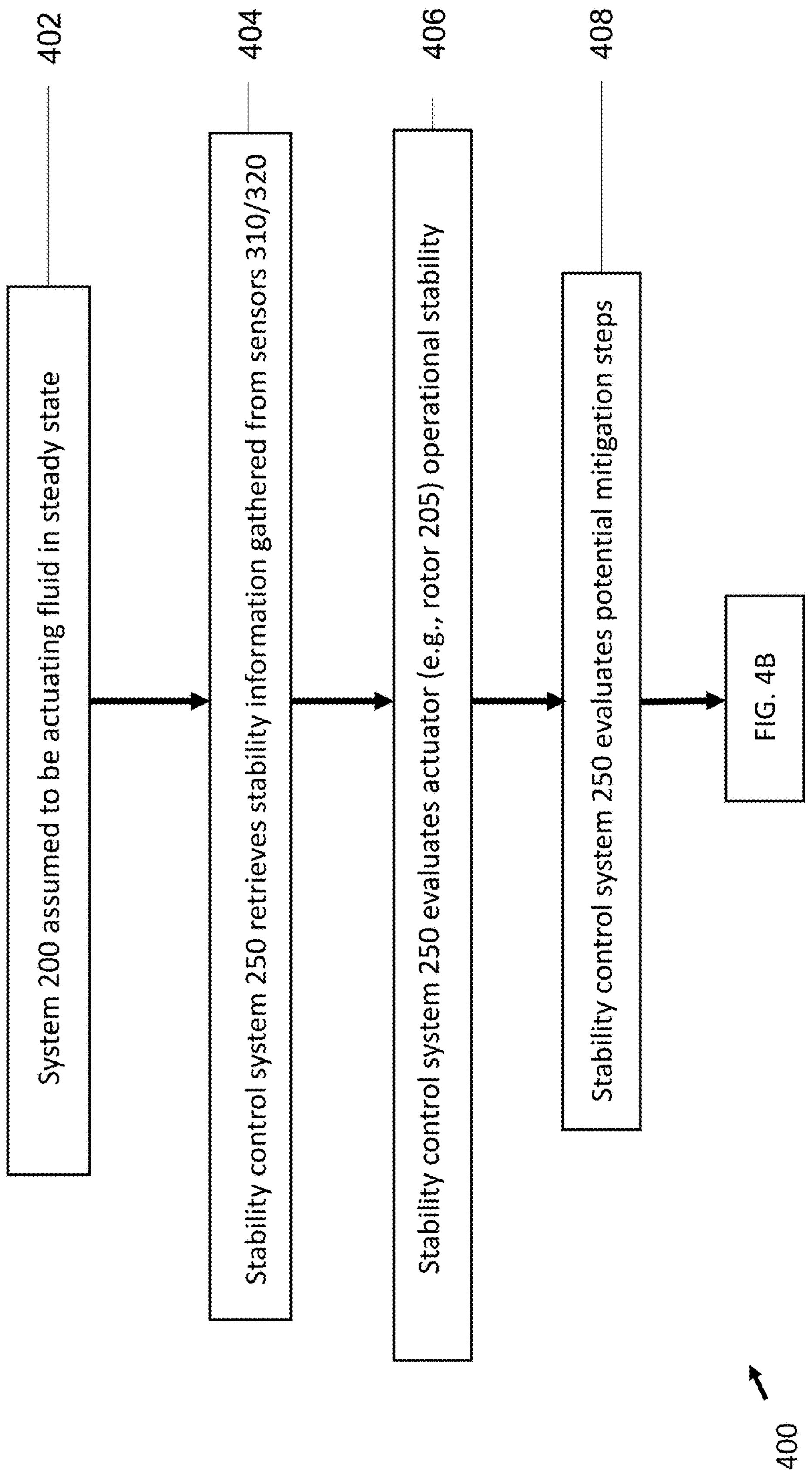
FIG. 4A shows an exemplary method 400 to implement the exemplary fluid actuation system 200 shown in FIG. 2A.
Figure 4B:
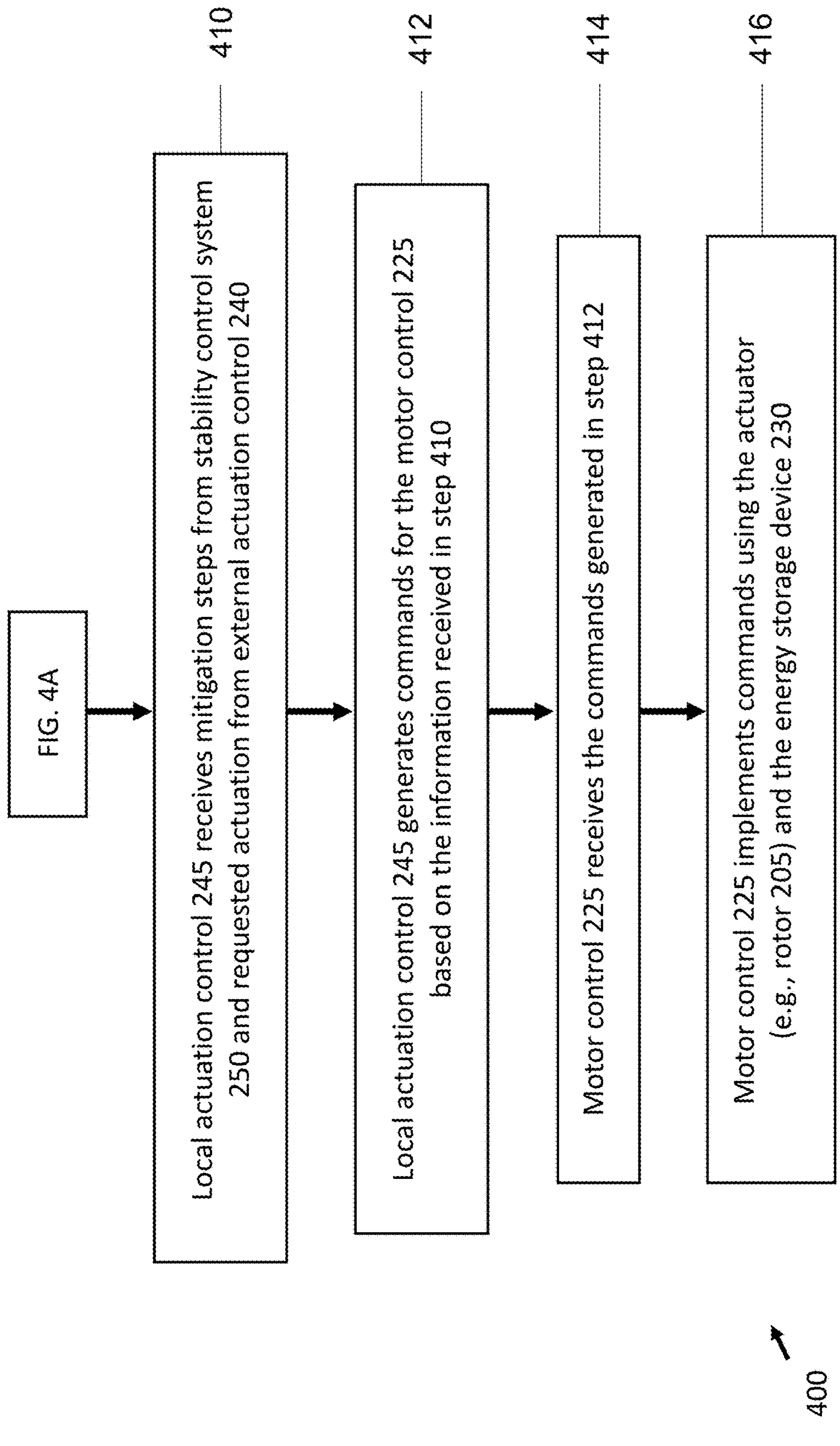
FIG. 4B continues FIG. 4A.

FIGS. 4A and 4B show an exemplary implementation 400 of the exemplary fluid actuation system 200 shown in FIG. 2A. FIGS. 4A and 4B describe steady state of actuation system 200 (e.g., excluding system startup or shut down). Shutting down or starting up system 200 can be done by conventional means.

Turning to FIG. 4A, in step 402, system 200 is assumed to be actuating fluid in a steady state. This can correspond to, for example, a vehicle undergoing propulsion (e.g., an aircraft in flight) or a ventilation system in full operation (e.g., ventilating an interior space). In this step, local actuation control 245 has sent instructions to motor control 225 for operating rotor 205. The instructions can combine a request from the external actuation control 240 (e.g., for a specific amount of thrust in the case that system 200 is operating a vehicle) and mitigation information from mitigation control 250*b*. Given the importance to maintain operability of the fluid actuation device, the controller may limit the operation of the device as commanded by external actuation control 240 or leverage the use of other actuators in the fluid actuation system to achieve both goals in a coordinated manner.

Note that assuming the system 200 is actuating fluid in a steady state in step 402 does not mean that system 200 must be actuating fluid in a steady state. Rather, this assumption simply provides a starting point for analysis of the stability of fluid flow and propulsion so that any detected deviations from stability can be diagnosed and mitigated. Included in step 402 is actuation of rotor 205 to move fluid. Actuation may be requested by the external actuation control 240 and implemented by the local actuation control 245. As discussed above, the local actuation control 245 may use a combination of information from the stability control system 250 and the external actuation control 240. The actuation may be, as described above, implemented via the motor control 225 using power provided by the energy storage device 230.

At step 404, the stability control system 250 performs an initial check on the gathered sensor information provided by the stability monitor 250*a*. In this step, stability monitor 250*a* inquires a series of sensors (e.g., sensors 310 and/or 320 shown in FIG. 3) to monitor pressure differences, expected or not, and other variables such as electrical current and power provided in the rotor 205 and other components. Any measured pressure differences may relate directly to mechanical loading on rotor 205, stator 210, or other components. The stability information gathered from the sensors by system 250 in this step may also, or alternatively, relate to current or power usage by various portions of the rotor 205 or other components. The latter may indirectly relate to mechanical loading on the rotor 205 in the sense that drawing more or less power than expected may be indicative of an unexpected change in mechanical loading. In these and other ways, the stability information gathered by system 250, and specifically stability monitor 250*a*, provides insight into the stability of mechanical loading on the rotor 205. As discussed above, any instabilities may be caused by pressure changes and/or unexpected aerodynamic forces.

At step 406, the stability control system 250 evaluates the stability information to, among other things, determine whether the rotor 205 is operating under stable conditions. For example, if the sensors 310/320 sense rapid changes in pressure or power provided to different portions of the rotor 205 (or other components), rotor 205 may be operating under unstable conditions.

In this step, the stability monitor may, for example, compare the latest sensor data with previously acquired and stored sensor data to detect changes in operation. In particular, the rate of such changes may be ascertained. If, for example, a rapid pressure drop is detected at this step, the stability monitor 250*a* may flag this as an indication of imminent stall. Stability monitor 250*a* may further indicate that the detected drop in pressure may be a candidate for mitigation and provide a recommended time frame for mitigation (e.g., during the next cycle of the stability monitor, over the next few milliseconds, or over another set time period, which could, for example, relate to the rate of detected change in pressure). Similar determinations can be made by analyzing other data (either instantaneous or time resolved) from the sensors, for example power distribution and/or current. In this case, rapid changes in this data can be used to deduce stall conditions.

Any suitable algorithm at this step may be employed to analyze the sensor data. Examples of suitable algorithms include least squares analysis, other statistical analysis, and machine learning algorithms. Suitable machine learning algorithms may include one or more of the following: an artificial neutral network (ANN), a deep neural network (DNN), a recurrent neural network (RNN), a long short-term memory (LSTM) RNN, or a convolutional neural network (CNN), and a graphical neural network (GNN). The machine learning algorithm may also be or include a support vector machine (SVM), a Bayesian classifier, or other suitable classifier. The machine learning algorithm may be or include a decision tree or a random forest.

At step 408, the stability control system 250 considers potential mitigation steps based on based on analysis of sensor data in step 406. More particularly, the mitigation control 250*b* may perform an analysis of the sensor data and/or any analysis or recommendations provided to it by the stability monitor 250*a*. This step may include similar analysis as that discussed above in the context of step 406. Any of the algorithms or analytical routines discussed above in the context of step 406 may also be used in the context of step 408.

In step 408, the mitigation control 250*b* may identify a particular mediation step. Such steps can include, for example, applying more power to the rotor 205 in response to detected pressure drop. As discussed above, this selective application of power can prevent a stall or surge in the rotor 205 operation according to, for example, the response dynamic shown in FIG. 1C. Other mitigation steps can include decreasing power applied or supplied to the rotor 205. This can also mitigate, for example, a power surge associated with a sudden increase in pressure causing the rotor 205 to revolve without using 100% of the applied power. Still other steps may include actively removing excess power from the motor control 225, rotor 205 or other components. Excess power in the rotor 205 may be facilitated by a supercapacitor, or other similar device, included in device 230. Supercapacitors, in particular and unlike most batteries, can quicky intake and store excess power. The stored excess power can be used, for example, in further mitigation steps and/or powering the rotor 205 in steady state (e.g., as in step 402). Here power applied may also be "dithered" (e.g., by imposing periodic fluctuations of power/torque with a frequency and magnitude chose to, for example, counteract instabilities).

In certain instances, the mitigation control 250*b* may decide not to perform a mitigation step. This could happen when, for example, the condition to be mitigated, as detected by the stability monitor 250*a* in step 406, is not severe enough to warrant intervention. In some cases, the mitigation contemplated by the mitigation control 250*b* may be counterproductive given other tradeoffs in the system. For example, increasing power to the rotor 205 at the expense of other components may, in some cases, cause the system to stall. The mitigation control 250*b* can, in certain cases, weight the propensity of an adverse effect arising from the mitigation against the adverse effect it seeks to mitigate. This analysis may take into account the evolution of the condition (e.g., a pressure drop) over time. In other instances, there may be the potential for the potential problem to self-correct without active mitigation by the system 250. In those cases, the mitigation control 250*b* should weigh the cost of mitigation against the probability of self-correction before deciding to mitigate. The mitigation control 250*b* may also evaluate the degree to which any detected condition is merely transient and will dissipate on its own quickly enough to prevent adverse effects on system 200.

In deciding mitigation steps, mitigation control 250*b* may take into account what power may be available to the system 220 and from which source. For example, if the energy storage device 230 has sufficient power available in a fast-discharging device, e.g., one or more of the supercapacitors or flywheels mentioned above, the control 250*b* may elect to perform mitigation steps requiring such a quick response. If, on the other hand, a certain mitigation response calls for delivery of a quantity of power on a time scale that the device 230 cannot provide at the required time, the control 250*b* may elect to forgo the mitigation. In this and other ways, the control 250*b* may select among possible mitigations based on the amount of power stored in device 230, how that power is stored (e.g., on which storage device), and how it can be delivered.

Each of the above-described determinations may be facilitated by training a machine learning algorithm to make mitigation decisions, including any algorithm described in the context of step 406 above. The training may be, for example, based on actual data collected from a system like system 200 in FIG. 2A. The training may also be facilitated by simulation or calculation, e.g., simulated data may be used to train the machine learning algorithm. Any suitable training algorithm may be used, including those used to train any model or algorithm described herein.

Turning to FIG. 4B, in step 410, the stability control system 250 provides the proposed mitigation steps to the local actuation control 245. In this step, the local actuation control 245 may also receive requested actuation from the external actuation control 240. In step 412, the local actuation control 245 then generates commands for the motor control 225 to implement the received mitigation steps, the requested actuation, or both. In this step, the local actuation control 245 may decide on specific implementation of the proposed mitigation, for example, by using certain aspects of the energy storage device 230 to power the motor control 225. The local actuation control 245 may further decide on the timing of mitigation and/or actuation and set a protocol for mitigation. In order to perform this analysis, the local actuation control 245 may rely upon any algorithm described herein, including the machine learning algorithms described in the context of step 406.

In step 414, the motor control receives commands generated in step 412. These commands include any mitigation steps and actuation requests. In step 416, the motor control 225 implements the commends by, among other things, powering the motor driving the rotor 205 and/or the compressor 310 by sending power from the energy storage device 230 according to the commands.

Continuous or Near Continuous Cycling Method 500

Figure 5:
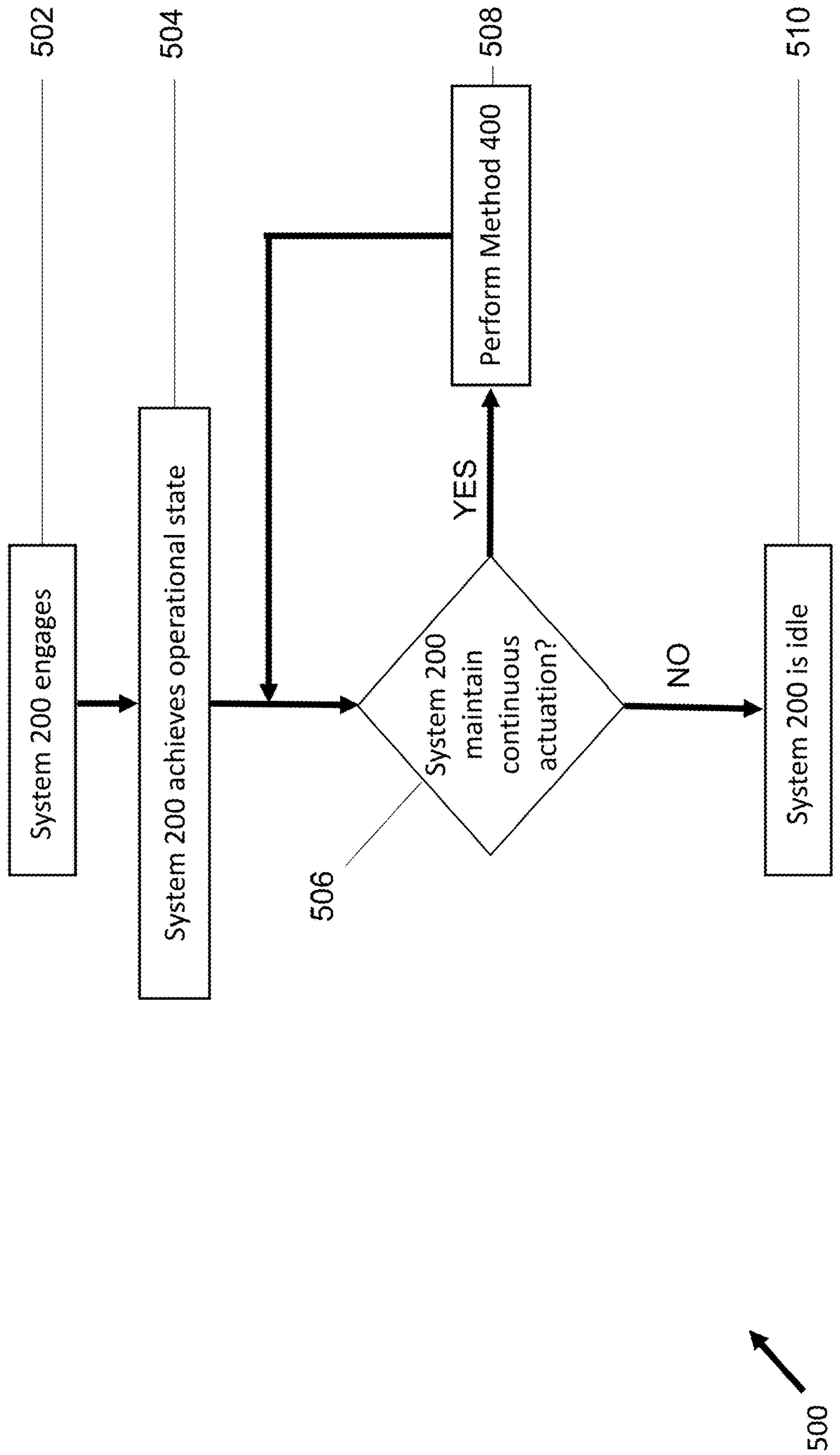
FIG. 5 shows a method 500 that maintains actuation in system 200 according to method 400.

FIG. 5 shows a method 500 that maintains actuation in system 200 according to method 400. More particularly, method 500 can iterate method 400 as long as system 200 seeks to maintain substantially continuous fluid actuation (e.g., propulsion). The continuous actuation state can be indicative of, for example, maintaining thrust in a vehicle (e.g., an aircraft). It can also be indicative of maintaining other conditions, such as consistent ventilation in a ventilation or climate control system.

In step 502, system 200 is engaged. Engagement could be, for example, powering up system 200. It could also represent engaging the rotor 205 of system 200 in operating status (e.g., to provide thrust or other fluid actuation).

In step 504, system 200 achieves an operational state. This generally denotes overcoming transients associated with engaging the system in step 502. Such transients could result from, for example, ramping rotor 205 up from zero angular velocity to an angular velocity capable of providing thrust. Conditions for achieving the operational state defined in step 504 need not be fixed and can be determined by user specific for the application. It should be understood that the operational state is merely a state in which the system 200 is reasonably close to the conditions necessary to become operational and provide actuation of fluid flow for the purpose of system 200.

In step 506, the system 200 determines whether it should maintain a continuous actuation. In this state, the system 200 may be, for example, providing thrust to a vehicle. Continuous actuation would be needed such that the vehicle has propulsion. In another example, the system 200 would be ready to provide continuous ventilation to a climate or ventilation system. If the system 200 determines in step 506 ("YES") that it will maintain continuous operation, it proceeds to step 508. Otherwise ("NO"), it will proceed to step 501.

In step 508, the system performs method 400. As discussed above, performing method 400 provides actuation via system 200. Method 400 also provides continuous stability monitoring and mitigation in its provision of fluid actuation. Once method 400 is performed in step 508, the system returns to step 506 to re-evaluate whether it should maintain continuous actuation. Therefore, the system 200 loops through steps 506 and 508 continuously until receives an indication it is no longer to maintain continuation actuation ("NO" in step 506). In that case, the system 200 proceeds to step 510.

In step 510, the system 200 is determined not to maintain continuous actuation. Generally, the system (and rotor 205) will then maintain an idle state. In the idle state, the system 200 will be able to re-engage (i.e., return to step 502 to provide actuation) when needed. If re-engagement is not needed, the system 200 may be powered down at this point.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

We claim:

1. A system for actuating fluid flow comprising:

a fluid actuator;

an electric motor;

a motor controller for controlling the motor;

a supercapacitor for powering the motor;

a stability monitor that assesses instability of operation of the fluid actuator;

a plurality of sensors configured to provide spatially resolved instability information to the stability monitor;

a mitigation control that mitigates instability of the fluid actuator via the motor controller on the assessment of the stability monitor, wherein:

the mitigated instability corresponds to a current measurement of the motor controller and the spatially resolved instability information; and a response time of the mitigation control is faster than changes in fluid flow in the system during fluid actuation.

2. The system of claim 1, wherein the mitigation control is configured to at least one of:

provide power to the motor via the supercapacitor and collect surplus power from the motor via the supercapacitor.

3. The system of claim 2, wherein:

at least one of the providing power to the motor and the collecting surplus power from the motor stabilizes operation of the fluid actuator; and the providing power to the motor and the collecting surplus power from the motor is faster than changes in fluid flow in the system during fluid actuation.

4. The system of claim 3 wherein the stabilizing operation of the fluid actuator comprises stabilizing fluid instability on the fluid actuator created by aerodynamic forces.

5. The system of claim 4, wherein the stabilizing of the fluid instability prevents at least one of a stall of the fluid actuator, a fluid cavitation in the system, and a surge in the system.

6. The system of claim 5, wherein the fluid instability causes variations of at least one of a fluid pressure in the system and an electric current through the motor.

7. The system of claim 6, wherein the fluid instability arises at least in part from unsteady mechanical loading of the fluid actuator.

8. The system of claim 7, wherein the stability monitor assesses the unsteady mechanical loading of the fluid actuator as an instability to be mitigated by the mitigation control.

9. The system of claim 7, wherein the stability monitor assesses at least one of a pressure signature and an acoustic signature of the mechanical loading as an instability to be mitigated by the mitigation control.

10. The system of claim 7, wherein the stability monitor assesses variations in electric current associated with the mechanical loading as an instability to be mitigated by the mitigation control.

11. The system of claim 1, wherein the supercapacitor has a response time for at least one of providing power to the system and removing power from the system that is faster than changes in fluid flow in the system during fluid actuation.

12. The system of claim 1, further comprising a power grid configured to provide power to the supercapacitor.

13. The system of claim 12, wherein the supercapacitor is configured to provide power to the motor substantially independently of variations in power provided by the power grid.

14. The system of claim 1, wherein the local energy storage device provides power to the motor such that performance of the system approaches a set point.

15. The system of claim 14, wherein the providing power to the motor such that performance of the system approaches a set point comprises providing rapid periodic variations in power to the motor.

16. The system of claim 1, wherein the system is part of a propulsion system for a vehicle.

17. The system of claim 1, wherein the system is part of a ventilation system.

18. A method for actuating fluid flow comprising:

actuating the fluid via a fluid actuator;

driving the fluid actuator via an electric motor;

controlling the electric motor via a motor controller;

powering the electric motor via a local energy storage device;

assessing stability of operation of the fluid actuator;

mitigating instability of the fluid actuator based on the assessment, wherein:

mitigating instability corresponds to a current measurement of the motor controller and spatially resolved instability information from a plurality of sensors; and a response time of mitigating instability is faster than changes in fluid flow in the system during fluid actuation.

* * * * *